Jan. 27, 1959   C. N. COOPER ET AL   2,871,334
WELDING APPARATUS

Filed Jan. 19, 1956   2 Sheets-Sheet 1

INVENTORS
CLEVELAND N. COOPER,
ARTHUR I. FREDERICK.
BY Terry and Cohn
ATTORNEYS.

Jan. 27, 1959 C. N. COOPER ET AL 2,871,334
WELDING APPARATUS

Filed Jan. 19, 1956 2 Sheets-Sheet 2

INVENTORS,
CLEVELAND N. COOPER,
ARTHUR I. FREDERICK,

BY *Terry and Cohn*
ATTORNEYS.

United States Patent Office 2,871,334
Patented Jan. 27, 1959

2,871,334

WELDING APPARATUS

Cleveland N. Cooper and Arthur I. Frederick, Webster Groves, Mo., assignors to The Pandjiris Weldment Co., St. Louis, Mo., a corporation of Missouri Application January 19, 1956, Serial No. 560,168

9 Claims. (Cl. 219—130)

This invention relates generally to improvements in welding apparatus, and more particularly to improvements in a flux-holding device adapted to hold, locate and define the mound of flux used in conjunction with any submerged arc welding procedure.

In the submerged arc method of welding, a welding electrode is fed toward the work while the electrode is moved relatively along the length of the weld, and at the same time, a granulated flux is fed around the arc so as to maintain it in a completely submerged condition. The advantages of this submerged arc method of welding are well known in that it produces a uniform bead which is of uniformly high merit. It is an important objective of the present invention to provide an improved device for supporting flux on and against the work to be welded, such a flux holding device being adapted to determine the size, shape and orientation of the flux blanket and adapted to maintain intimate contact with the work regardless of surface irregularities.

The above described functional advantages and other important objects are realized by the provision of wire brushes in the flux holding device adapted to engage the work and arranged to support flux against the work to maintain the welding arc in a submerged condition. These wire brushes are of a density to support the granular flux and of a flexibility to maintain intimate wiping time contact with the work piece.

Another important object is achieved by the provision and utilization of wire brushes in a flux holding device in that a durable structure is realized having extremely good wearing qualities, the wire brushes being particularly capable of withstanding the effects of hot molten flux and adapted to permit quick dissipation of heat.

Still another important object is realized in that the improved flux holding device can be readily applied to welding fixtures and machines of the manual, semi-automatic and fully automatic type utilized in submerged arc welding procedure.

Yet another important object is realized in that the wire brushes in the present flux holding device are adapted to maintain the flux blanket for straight line or contour welding in one or more planes, and adapted to permit easy welding of products having surface irregularities.

The foregoing and numerous other objects and advantages of the invention will more clearly appear from the following detailed description of a preferred embodiment, particularly when considered in connection with the accompanying drawings, in which.

The welding apparatus includes a frame for supporting the flux holding device, the frame being adapted to urge the device into operative relation with respect to the work piece. Referring now by characters of reference to the drawings, the frame includes a square rod 10 that is journalled in a guide means (not shown) to assure horizontal movement of the flux holding device relative to the work to be welded. An upstanding tubular post 11 is secured to rod 10 and is supported and carried by a bottom plate 12. A pair of truss brackets 13 are secured to upstanding post 11 and to bottom plate 12, the brackets 13 realizing a reenforced unitary structure. Automatic means such as an air operated cylinder and piston (not shown) is operatively connected to tubular post 11 and is adapted to move the frame in a horizontal direction toward and away from the work piece.

Figure 1:
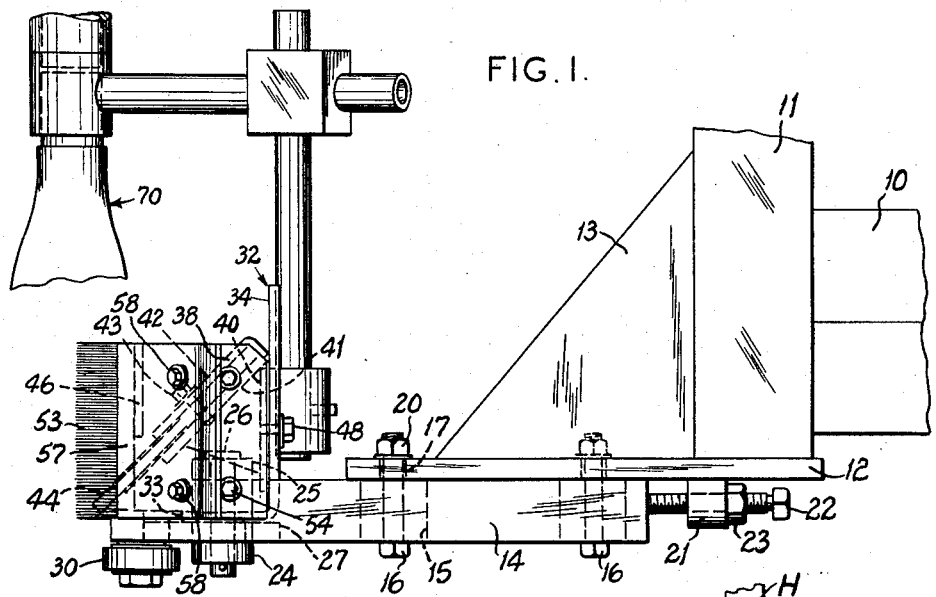
Fig. 1 is a fragmentary, end elevational view of the welding apparatus including the improved flux holding device.
Figure 2:
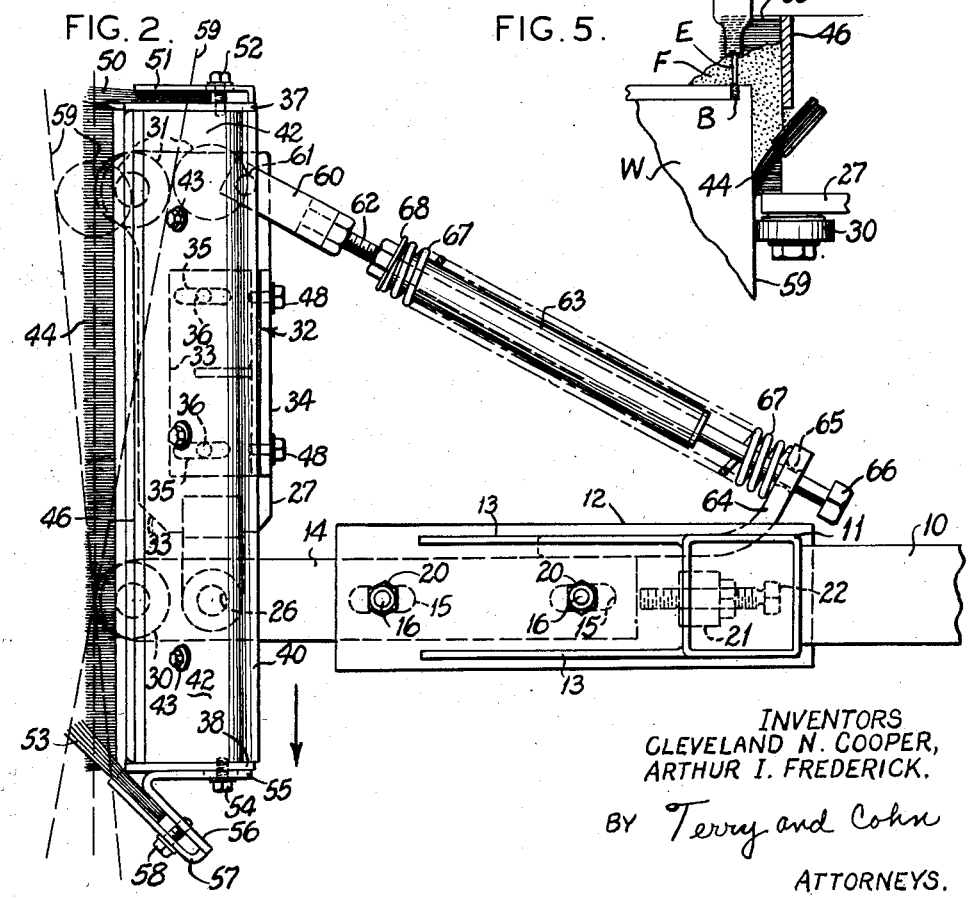
Fig. 2 is a fragmentary, top plan view of the welding apparatus including the flux holding device shown in Fig. 1, the dotted lines indicating other possible positions of the flux holding device.
Figure 4:
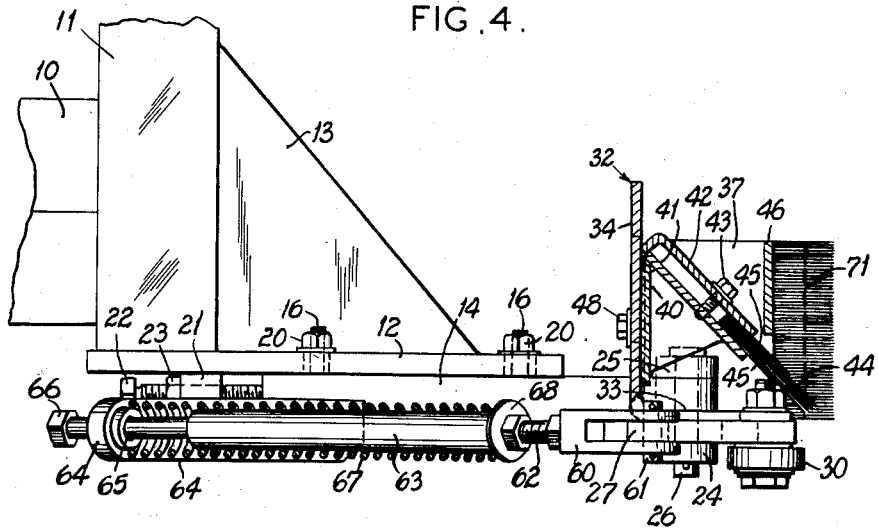
Fig. 4 is a fragmentary, end elevational view of the welding apparatus opposite to that shown in Fig. 1, the flux holding device being shown in cross section.

The frame includes a frame arm 14 located below plate 12 and extending outwardly therefrom as is shown in Figs. 1, 2 and 4. A pair of elongate slots 15 is formed in arm 14, the slots 15 receiving bolts 16 that extend upwardly through apertures 17 formed in bottom plate 12. Nuts 20 threadedly connected to bolts 16 serve to clamp arm 14 to plate 12. It is believed clear that frame arm 14 may be slidably adjusted with respect to plate 12 to determine the amount of extension of arm 14 beyond plate 12 within the range defined by the position of bolts 16 in elongate slots 15.

Secured to the bottom of plate 12 and located at the rear of arm 14, is a depending lug 21 that is threaded to receive adjustable screw bolt 22, one end of which engages arm 14. A precise and minute adjustment of arm 14 may be achieved by threadedly manipulating screw bolt 22, the bolt 22 abutting the end of arm 14 to provide a stop. A nut 23 threadedly received on screw bolt 22 can then be tightened against lug 21 in order to secure bolt 22 in the desired position.

Figure 3:
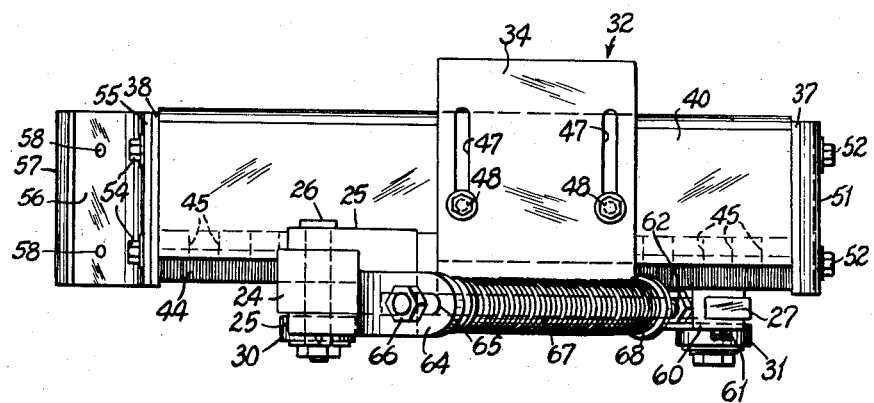
Fig. 3 is a rear elevational view of the flux holding device.

A U-shaped bracket 24 includes opposed arms 25 (Fig. 3) located over and embracing the extended portion of frame arm 14. The bracket 24 is pivotally connected to arm 14 by a pivot pin 26 extending through opposed arms 25. Fastened to U-shaped bracket 24 is a support plate 27 that is adapted for pivotal movement about pin 26.

A roller 30 is mounted on the bottom of frame arm 14 at the extended end portion, the roller 30 projecting laterally outwardly of arm 14 for rolling engagement with the work piece. A similar roller 31 is mounted on the bottom of plate 27 and extends laterally outwardly therefrom for a similar purpose. The rollers 30 and 31 constitute a guide means for directing the flux holding device along the work. Other functional advantages of rollers 30 and 31 will be discussed subsequently upon description of the structure and operation of the flux holding device.

Mounted on top of support plate 27 is an angle bracket 32 having a base portion 33 and having a vertical portion 34 located at the rear of plate 27. The plate 27 is provided with a pair of elongate slots 35 (Fig. 2) immediately below base portion 33. A pair of fastening elements 36 carried by base portion 33 extend downwardly through slots 35. By selectively moving fastening elements 36 in slots 35, the bracket 32 may be adjusted in position with respect to plate 27. The fastening elements 36 are utilized to clamp the bracket in the adjusted position.

The flux holding device is carried by the vertical portion 34 of bracket 32, the device including a brush holding frame having opposed, spaced end plates 37 and 38 connected by an integral, longitudinally disposed rear plate portion 40. The rear plate portion 40 includes a reversely bent brush-holding portion 41 (Fig. 4) that is angularly related to vertical plate portion 40 and extends downwardly and forwardly between end plates 37 and 38. A clamp plate 42 is arranged over brush-holding portion 41 and is detachably connected to portion 41 by a plurality of screw bolts 43.

Disposed between clamp plate 42 and frame portion 41 is a wire brush 44 extending longitudinally the entire length of the frame between end plates 37 and 38. The wire brush 44 extends downwardly and extends laterally outwardly of the rollers 30 and 31 to assure engagement with the work piece. The wire brush itself consists of many individual, fine wires, each acting as a spring beam to maintain intimate contact with the work piece regardless of its irregularity. The brush is of a density to support granular flux against the work piece, and has a flexibility to assure intimate contact even with irregular work surfaces. It will be understood that this wire brush 44, and the other brushes later described, can be straight, curved, compound curved, rigid, flexible or endless type, and can be composed of various types of straight, formed or woven wires. In these brushes, metallic or non-metallic materials can be used to form the wires. Bronze and stainless steel have been found excellent for welding applications.

To facilitate intimate contact of the wire brush with the work piece, a plurality of spring plate inserts 45 (Figs. 3 and 4) are disposed above and below the brush and are retained between clamp plate 42 and frame portion 41. The spring inserts 45 extend outwardly of the brush holding frame and tend to reenforce the individual wires of the brush.

For purposes which will later appear clear, a vertical frame portion 46 is disposed above wire brush 44 in spaced relation to the work-engaging end of the brush, the frame portion 46 extending between end plates 37 and 38. The frame portion 46 assists the wire brush 44 in supporting flux F against the work piece W and serves to bank the flux over on the work piece, thus helping the brush to determine the size, shape and orientation of the flux blanket, all as shown in Fig. 5.

An adjustable connection is utilized to mount the brush holding frame to angle bracket 32. Provided in the vertical portion 34 of bracket 32 is a pair of vertical elongate slots 47 (Fig. 3) adapted to receive fastening elements 48 carried by rear frame plate portion 40. By manipulating fasteners 48 in slots 47, the brush-holding frame may be adjusted vertically within the range determined by the slots, and hence the position of wire brush 44 may be vertically adjusted with respect to the work piece.

A wire brush 50 (Fig. 2), similar in construction to brush 44, is located in vertical contiguous relation to end plate 37 and is retained by clamp plate 51 that is secured to end plate 37 by fastening screw 52. The wire brush 50 extends laterally outwardly of the brush-holding frame to enable engagement of the brush 50 with the work piece, the brush 50 extending outwardly to a position immediately adjacent wire brush 44. Another wire brush 53 is located at the other end of the flux holding device. Secured by fastening elements 54 to end plate 38 is an angle bracket 55 having a reversed portion 56. The wire brush 53 is located between the reversed bracket portion 56 and a clamp plate 57 detachably secured by fastening screws 58. The wire brush 53 is similar in construction and composition to the wire brushes 44 and 50 described above. The wire brush 53 is disposed vertically, yet is arranged in angular relation to the lower brush 44, the end brush 53 extending laterally outwardly of the brush-holding frame to adjacence with lower wire brush 44 and hence adapted to engage the work piece in wiping relation. In the preferred construction, the wire brush 53 is angularly related in the manner shown in Fig. 2 to assure an optimum wiping relation to the work piece in any pivoted position of the brush-holding frame as shown in dotted lines, since the flux holding device is normally moved in the direction shown by the arrow with respect to the work piece. The brushes 44, 50 and 53 are arranged to provide a substantially contiguous brush flange adapted to engage the work piece to form a pocket for supporting flux, the brushes and brush-holding frame determining the size, shape and orientation of the flux blanket to keep the arc submerged during the welding process, as best shown in Fig. 5.

Figure 5:
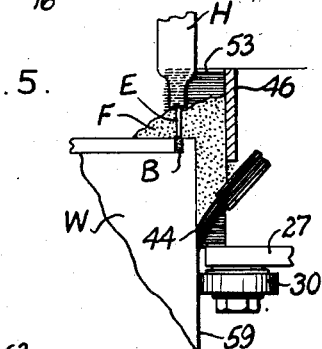
Fig. 5 is a fragmentary view, partly in cross section, of the flux holding device in operative relation to a work piece.

From Fig. 5 it is seen that the arc of electrode E is completely submerged in flux F incident to forming bead B, the electrode E being fed automatically at a predetermined rate through welding head H. The lower brush 44 wipes the upright surface 59 of work piece W and serves to support flux, while brush 53 has a lower portion that wipes the upright surface 59 and an upper portion that wipes the top of the work piece. The brush 50 engages the work piece in a manner similar to brush 53 at the opposite end of the flux-holding device. The dotted line 71 in Fig. 4 indicates the extent the brushes 53 and 44 can be flexed by a vertical work piece surface as determined by the position of rollers 30 and 31.

A spring means is connected to support plate 27 and tends to urge the brush-holding frame and wire brushes in a direction to assure intimate contact of the brushes with the work. The spring means includes a yoke 60 (Fig. 4) connected to plate 27 by a pivot pin 61, the yoke 60 being connected to a threaded member 62 on an elongate rod 63. Secured to frame arm 14 is a curvilinear plate 64 having an aperture 65 (Fig. 2). The rod 63 extends through aperture 65 of plate 64 and is held in position by end nut 66. A compression spring 67 is located about rod 63 between plate 64 and shoulder 68 provided on rod 63. The action of spring 67 against shoulder 68 and plate 64 tends to urge the brush-holding frame, and hence the wire brushes in a direction toward the work piece to assure contact of the wire brushes during pivotal movement of the brush-holding frame about pivot pin 26.

The operation and functional advantages of the welding apparatus and the flux holding device are believed to have become fully apparent from the foregoing detailed description, but for completeness of disclosure it will be noted that the flux holding device is moved in a direction toward the work piece so that wire brushes 44, 50 and 53 intimately engage such work piece as is shown in Fig. 5. In this position rollers 30 and 31 engage the work and serve as guide means during relative movement of the flux holding device along the work piece. Further, the rollers 30 and 31 serve to determine the degree of intimate contact of the wire brushes with the work piece. The granular flux is then fed into the pocket provided by wire brushes 44, 50 and 53, the brushes and the frame portion 46 supporting and banking the flux against the work piece and over the weld to assure that the arc is maintained in a submerged condition. As a result of the wiping relation of the wire brushes with the work piece and the other particular functional advantages of utilizing wire brushes having the density and flexibility described, the flux blanket is maintained in desired position on the work piece, as the flux holding device is moved relative to such work piece incident to submerged arc welding procedure.

A suction mechanism generally indicated at 70 in Fig. 1 is utilized to retrieve the excess flux left on the top of the work piece during welding operation, such flux being returned to a hopper (not shown) and then fed back through a conventional flux tube to the flux holding device, and more particularly to the pocket provided by the wire brushes.

The wire brushes 44, 50 and 53 engage the work piece to define the size, shape and orientation of the flux blanket and maintain intimate contact regardless of any irregularity during straight line or contour welding.

Although the invention has been described by making detailed reference to a single preferred embodiment, such detail is to be understood in an instructive, rather than in any restrictive sense, many variants being possible within the scope of the claims hereunto appended.

We claim as our invention:

1. A flux holding device for a welding apparatus comprising a frame, and means carried by said frame for supporting flux against the work to be welded, said means consisting of wire brush arranged to engage the work and to determine the size, shape and orientation of the flux blanket, the wire brush consisting of many individual fine wires arranged close together to afford a density to support flux, said wires being resiliently flexible to constitute spring beams that assure intimate contact with the work regardless of surface irregularities, and means connected to the frame urging the wire brush against the work.

2. A flux holding device comprising a frame, wire brush carried by said frame and arranged to engage the work to be welded, the wire brush consisting of many individual fine wires arranged close together to afford a density to support flux against the work, said wires being flexible to constitute spring beams that assure intimate contact with the work regardless of surface irregularities, and guide means on said frame adapted to engage said work, the guide means being arranged to determine the degree of flexible contact of the wire brush with the work.

3. A flux holding device for a welding apparatus comprising a brush holding frame, and wire brush carried by said frame, the wire brush having a lower portion and upwardly extending side portions providing a substantially continuous wire brush flange adapted to engage the work to be welded to provide a pocket to support flux against the work, the wire brush consisting of many individual fine wires arranged close together to afford a density to support flux, said wires being resiliently flexible to constitute spring beams that assure intimate contact with the work regardless of surface irregularities, and means connected to the said frame urging the wire brush against the work.

4. A flux holding device for a welding apparatus comprising a brush holding frame, a lower brush carried by said frame and an upwardly extending side brush carried by said frame at each end, the brushes being arranged to provide a substantially continuous flange adapted to engage the work to be welded, the wire brushes consisting of many individual fine wires arranged close together to afford a density to support flux, said wires being resiliently flexible to constitute spring beams that assure intimate contact with the work regardless of surface irregularities, the wire brushes providing a pocket for holding flux against the work and determining the size, shape and orientation of the flux blanket, and means connected to the said frame urging the wire brush against the work.

5. In a welding apparatus, a frame arm, a plate secured to said arm, a bracket on said plate, a slotted connection between said bracket and said plate for permitting relative adjustable movement, a brush holding frame carried by said bracket, a slotted connection between said bracket and brush holding frame for permitting adjustable relative movement, and wire brush carried by said brush holding frame and extending laterally outwardly to engage the work to be welded, the wire brush being arranged to provide a pocket for supporting flux against the work, the wire brush consisting of many individual fine wires arranged close together to afford a density to support flux, said wires being flexible to constitute spring beams that assure intimate contact with the work regardless of surface irregularities, the slotted connections permitting an adjustment of the degree of contact of the flexible wire brush with the work.

6. In a welding apparatus, a frame arm, a support plate secured to said arm, a bush holding frame, means connecting the brush holding frame to said plate, said means including an adjustable connection that permits the brush holding frame to be moved adjustably toward and away from the work to be welded, wire brush carried by said brush holding frame and arranged to engage the work to provide a pocket for supporting flux against the work, the wire brush consisting of many individual fine wires arranged close together to afford a density to support granular flux against the work, the wires being flexible to constitute spring beams that assure intimate contact even with irregular work surfaces, and guide means on said frame arm and work plate adapted to engage said work to determine the degree of intimate contact of the flexible wire brush with the work.

7. In a welding apparatus, a frame arm, a support plate having one end pivoted to said arm, a brush holding frame, means connecting the brush holding frame to said pivoted plate, wire brush held by said brush holding frame, means connected to said arm urging the wire brush against the work to be welded, the wire brush being arranged to engage the work to provide a pocket for supporting flux against the work, and spring means connected to the other end of the pivoted plate tending to urge the wire brush against the work and permitting the brush to follow the work contour incident to pivotal movement of the brush holding frame.

8. In a welding apparatus, a frame arm, a support plate pivotally connected to the arm, a brush holding frame, means connecting the brush holding frame to said pivoted plate, wire brush held by said brush holding frame and arranged to engage the work to be welded to provide a pocket for supporting flux against the work, the brush holding frame being pivotally movable to permit the wire brush to follow the contour of the work, and guide means on said frame arm and support plate adapted to engage the work and adapted to determine the degree of intimate contact of the wire brush with the work.

9. In a welding apparatus, a frame arm, a support plate having one end pivoted to said arm, a brush holding frame, means connecting the brush holding frame to said pivoted plate, wire brush held by said brush holding frame, means connected to said arm urging the wire brush against the work to be welded, the wire brush being arranged to engage the work to provide a pocket for supporting flux against the work, the wire brush consisting of many individual fine wires arranged close together to afford a density to support flux said wires being flexible to constitute spring beams that assure intimate contact with the work regardless of surface irregularities, spring means connected to the other end of said plate urging the wire brush against the work and permitting the brush to follow the work contour incident to pivotal movement of the brush holding frame, and guide means on said frame arm and support plate adapted to engage the work to determine the degree of intimate contact of the wire brush with the work.

References Cited in the file of this patent

UNITED STATES PATENTS

| | | |
|---|---|---|
| 1,568,226 | Larson | Jan. 5, 1926 |
| 2,294,439 | Bagley | Sept. 1, 1942 |
| 2,713,106 | Arnold | July 12, 1955 |
| 2,733,328 | Newbold | Jan. 31, 1956 |
| 2,752,468 | Costello | June 26, 1956 |